United States Patent

[11] 3,593,315

[72] Inventor Rajani M. Patel
Arcadia, Calif.
[21] Appl. No. 858,574
[22] Filed Sept. 17, 1969
[45] Patented July 13, 1971
[73] Assignee Burroughs Corporation
Detroit, Mich.

[54] METHOD AND APPARATUS FOR DEALLOCATING SMALL MEMORY SPACES ASSIGNED TO A COMPUTER PROGRAM
10 Claims, 2 Drawing Figs.

[52] U.S. Cl. .......... 340/172.5
[51] Int. Cl. .......... G06f 9/00
[50] Field of Search .......... 340/172.5

[56] References Cited

UNITED STATES PATENTS

| | | | |
|---|---|---|---|
| 3,387,274 | 6/1968 | Davis | 340/172.5 |
| 3,412,382 | 11/1968 | Couleur et al. | 340/172.5 |
| 3,444,525 | 5/1969 | Barlow | 340/172.5 |
| 3,449,724 | 6/1969 | Boland et al. | 340/172.5 |
| 3,487,370 | 12/1969 | Goshorn et al. | 340/172.5 |

*Primary Examiner*—Paul J. Henon
*Assistant Examiner*—R. F. Chapuran
*Attorney*—Christie, Parker and Hale

ABSTRACT: An arrangement for deallocation of small spaces in an addressable memory no longer needed for use by a computer program. Blocks of memory are each subdivided into a predetermined number of equal areas. The base address of a block, the size of the subdivided areas in the block, and the availability status of each area in the block are specified in a status word stored as one of a list of such status words in memory. Whenever a particular size area is no longer needed in memory, the status words are examined to locate a block having an area of the required size. The addresses of each area in the block are then examined to find an area having a specified address. If the specified area address is found, the associated status bit in the status word in memory is reset to indicate the area is again available for use by the computer program. If all other areas in the same block are also available, the status word for that block is eliminated from the list.

INVENTOR
RAJANI M. PATEL

BY

Christie, Parker & Hale
ATTORNEYS

METHOD AND APPARATUS FOR DEALLOCATING SMALL MEMORY SPACES ASSIGNED TO A COMPUTER PROGRAM

FIELD OF THE INVENTION

This invention relates to digital computers, and more particularly, is concerned with a method and apparatus for deallocating small memory spaces no longer in use by a computer program.

BACKGROUND OF THE INVENTION

In present day multiprocessing systems, in order to conserve required addressable memory space, and to adapt the system to automatic programming, it is desirable that memory space be allocated to a program dynamically and that addressing of memory by the program be done indirectly. This permits available memory space to be allocated to a program as needed and then deallocated when the program or segment of the program is completed. Such an arrangement permits much more efficient use of the memory space and permits each program to be compiled independently of absolute memory addresses.

The management of memory is accomplished by routines stored as part of the Master Control Program (MCP). When an object program requires memory space which has not yet been allocated, the object program is interrupted and the MCP enters a routine for allocating the required space. To achieve this dynamic allocation and to protect the already allocated spaces from being invaded, memory space is arranged in two linked chains. All available spaces are linked together in one chain while all spaces in use are linked together in another chain. In terms of address locations, the spaces linked by these two chains are scattered throughout memory. To provide the necessary information to link these spaces together, such as the address of the previous space in the chain, the address of the next space in the chain, the size of the space, et cetera, three or four control words must be stored in memory for each memory space in the two chains. This "Overhead" required by the MCP to manage the memory becomes particularly wasteful of memory space where a large number of very small spaces are established and wasteful of processing time where such areas are to be managed frequently.

In copending application Ser. No. 858,748, filed Sept. 17, 1969, by the same inventor as the present invention and assigned to the same assignee, there is described an arrangement for allocating small memory spaces. This is accomplished by providing an arrangement in which one or more spaces (hereinafter called blocks) in the linked chain of available spaces are transferred to the in-use and subdivided into a predetermined number of "mini" areas, the mini areas in any one block being equal in length, i.e., equal in the number of sequentially addressable locations within each of the mini areas. When an area in memory smaller than some predefined size is required by the requesting program, a search is made through a group of area status words (ASW) stored in memory. Each ASW defines the base address of a subdivided block, the size of the mini areas of that block, and the availability or in-use status of each mini area. The bits defining availability status are arranged in sequence within the ASW that corresponds to the sequence of mini areas within the block so as to provide address indexing information of the mini areas from the base address.

By searching the list of area status words, a block may be located having the required size mini areas. The status bits are then examined to determine the address of an available mini area within the block. If no block is found having the required mini area size, or if all the mini areas of the required size are in use, a new status word is added to the list defining a new block subdivided into the required size of mini areas. In either event, an address is made available to the system of an available mini area of the required size. The amount of "overhead" is thereby substantially reduced since a single additional control word, the ASW, is all that is required for allocation of a large number of mini areas in memory.

SUMMARY OF THE INVENTION

The present invention is directed to an arrangement in which any designated mini area in a block can be returned to an Available status when the information stored at that location in memory is no longer needed by the program. It further provides that when all of the mini areas in a block are returned to an Available status, the associated area status word is removed from the list of area status words in memory.

The address and size of the mini area to be deallocated is specified by the program. The list of area status words is then searched for a block having the specified size areas. When the correct size is found, the addresses of the areas in the block are compared to the specified address to locate the particular area in the block. If present, the particular status bit in the area status word is reset to indicate the area is again available. All other status bits in the same area status word are examined and if they indicate all mini areas within the block are in Available status, the area status word is removed from the list in memory and replaced by the last status word in the list. An Interrupt is then signalled to the computer to stop execution of the program and to initiate a routine to deallocate the entire block.

DESCRIPTION OF THE DRAWINGS

For a more complete understanding of the invention, reference should be made to the accompanying drawings, wherein.

DETAILED DESCRIPTION

Figure 1:
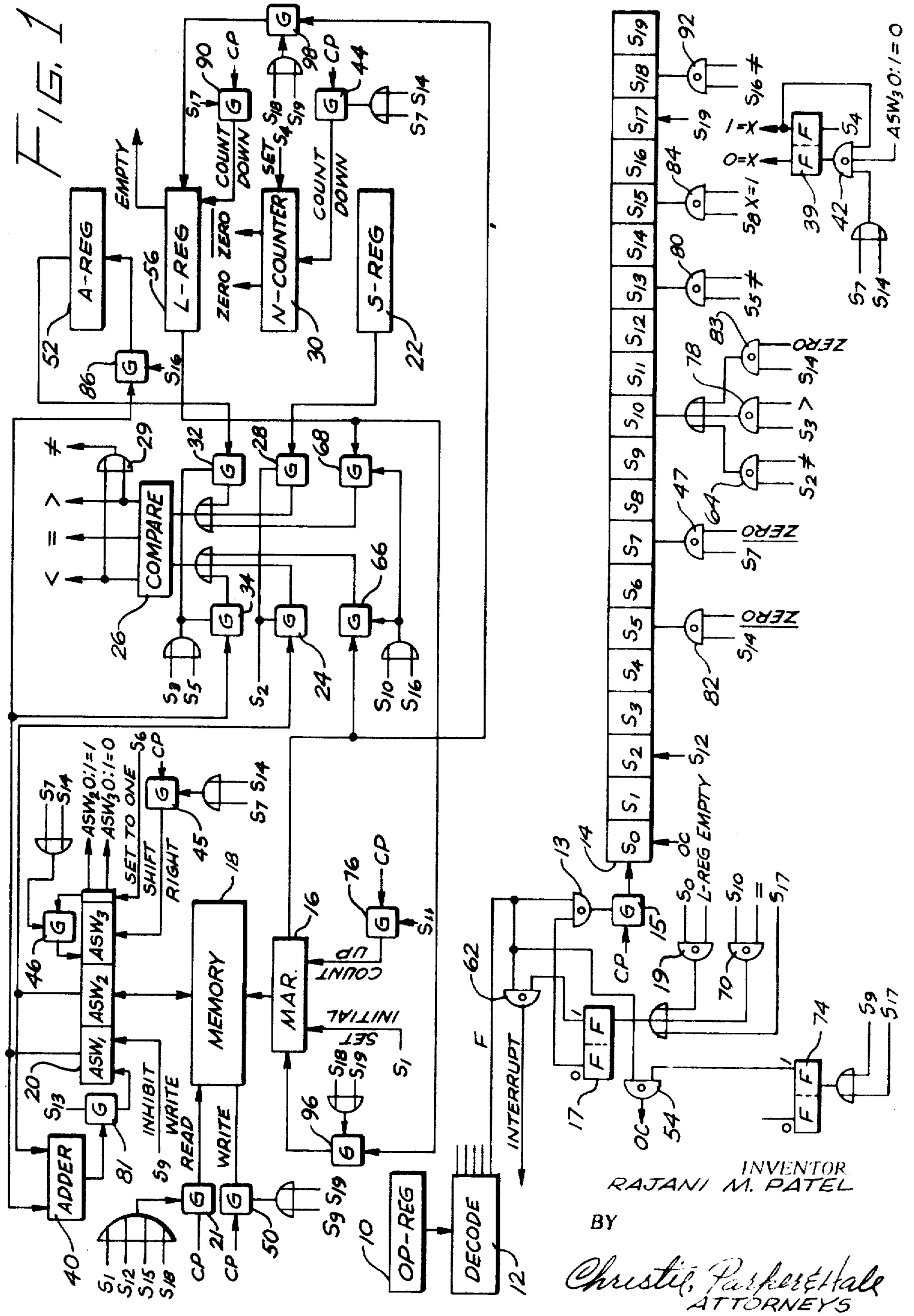
FIG. 1 is a schematic block diagram of one embodiment of the present invention.

In the following description it is assumed that a processor, in executing an object program, from time to time needs to clear a space in memory. If the size of space to be cleared is not greater than some predetermined amount, for example, ten words of memory, then a routine called the "Forget" operation is executed. Referring to FIG. 1, there is shown apparatus for performing this Forget operation. In executing a stored program, the operators, as they are fetched from memory, are placed in an OP register 10. There each operator is decoded by a decoding circuit 12, which, in response to each different operator, provides an output level on a corresponding one of a plurality of outputs. The particular operator is then executed by control logic in the processor. Assuming the operator is a Forget operator, the decoder provides an output level on a line F.

Execution of an operator is under the control of a sequence counter, indicated generally at 14. The sequence counter has a plurality of stable states, designated $S_0$ through $S_{19}$. The counter normally advances through these states in synchronism with a string of clock pulses, designated CP, applied to the counter 14 through a gate 15. However, the sequence can be set to any one of the stable states in synchronism with a clock pulse by the presence of an input level applied to the corresponding stage of the counter. The use of sequence counters to control the execution of instructions in computers is shown, for example, in U.S. Pat. No. 3,001,708.

Initially the sequence counter idles in the $S_0$ state. When the decoder 12 sets the level on the output F, this level is applied to a logical AND circuit 13 together with the 0 output of a control flip-flop 17. This flip-flop is initially set to zero. However, if there are no area status words in memory, the Forget operator is in error. This condition is tested initially by examining a register 56, called the L-register, which normally stores the address of the last area status word of the list in memory. If the L-register 56 is empty, the control flip-flop 17 is set to 1 by the output of an AND circuit 19 to which the $S_0$ state and an L-register empty output from the L-register 56 are applied. An AND circuit 62 senses the F line from the decoder 12 and the 1 state of the flip-flop 17, signalling an Interrupt to the computer system. At the same time the gate 15 interrupts operation of the sequence counter 14. Otherwise, the first clock pulse passed by the gate 15 then advances the sequence counter 14 from $S_0$ to $S_1$. The subsequent operation of the Forget operation is summarized by the flow diagram of FIG. 2.

During the $S_1$ state a memory address register MAR, indicated at 16, is set to a predetermined initial or base address of the list of area status words stored in an addressable memory indicated at 18. After the MAR register 16 is set to the base address by the $S_1$ level from the sequence counter 14, a memory READ cycle is initiated by which the first word in the list of area status words is transferred to a memory information register 20. To this end, a CP is applied to the READ input of the memory 18 through a gate 21 to which the $S_1$ level is also applied.

Each area status word is divided into three portions, $ASW_1$, $ASW_2$, and $ASW_3$. $ASW_1$ specifies the base address of a block of word locations in the memory. $ASW_2$ designates the size of the mini areas into which this block is subdivided. $ASW_3$ is a group of bits corresponding in number to the number of mini areas within the block, each bit designating whether the corresponding mini area in the block is available or in use, designated respectively by a binary 1 and a binary 0. For the present description, the number of mini areas into which a block is subdivided, regardless of the size of the mini areas, is assumed to be twenty. However, the number of mini areas may be any selected number, and may be varied by a program parameter if desired. It will be understood that a fixed number of 20 mini areas has been selected by way of example only in describing the embodiment of the invention set forth in FIG. 1.

After the first area status word in the list has been read into the register 20 and the sequence counter 14 has advanced to the $S_2$ state by the next CP, a comparison is made between the mini area size designated by the portion $ASW_2$ of the area status word in the register 20, and the size of memory requested by the object program as previously stored by the program in an S-register, indicated at 22. A gate 24 to which the $S_2$ state is applied gates $ASW_2$ to one input of a Compare circuit 26. A gate 28 similarly gates the contents of the S-register 22 to the other input of the Compare circuit 26. The Compare circuit 26 provides an output level on one of three outputs, designated =, < and >, depending on the condition of the two inputs to the Compare circuit 26. The > and < outputs of the Compare circuit 26 are combined by an OR circuit 29 to provide a ≠ output condition.

If the comparison is equal, indicating that the block designated by the area status word has the specified mini area size, the sequence counter 14 advances to $S_3$ and a further comparison is made between the required area address, stored in an A-register 52 by the object program, and the base address specified by the $ASW_1$ portion of the status word in the memory register 20. To make the comparison, the contents of the A-register 52 are coupled through a gate 32, to which the $S_3$ state is applied, to one input of the Compare circuit 26. Similarly a gate 34, to which the $S_3$ state is applied, couples the contents of the $ASW_1$ portion of the register 20 to the other input of the Compare circuit 26. If the Compare circuit indicates that the address in the A-register 52 is equal to or greater than the base address $ASW_1$, this means that the requested area has either been located, or may be within the block defined by the area status word. In any event, the sequence counter 14 advances automatically to the $S_4$ state by the next clock pulse.

During the $S_4$ state, a control flip-flop 39 is turned on, providing an output on the line designated X=1. Also an N-counter 30 is set to the number of mini areas, e.g., twenty. The sequence counter then advances to the $S_5$ state in response to the next clock pulse.

Figure 2:
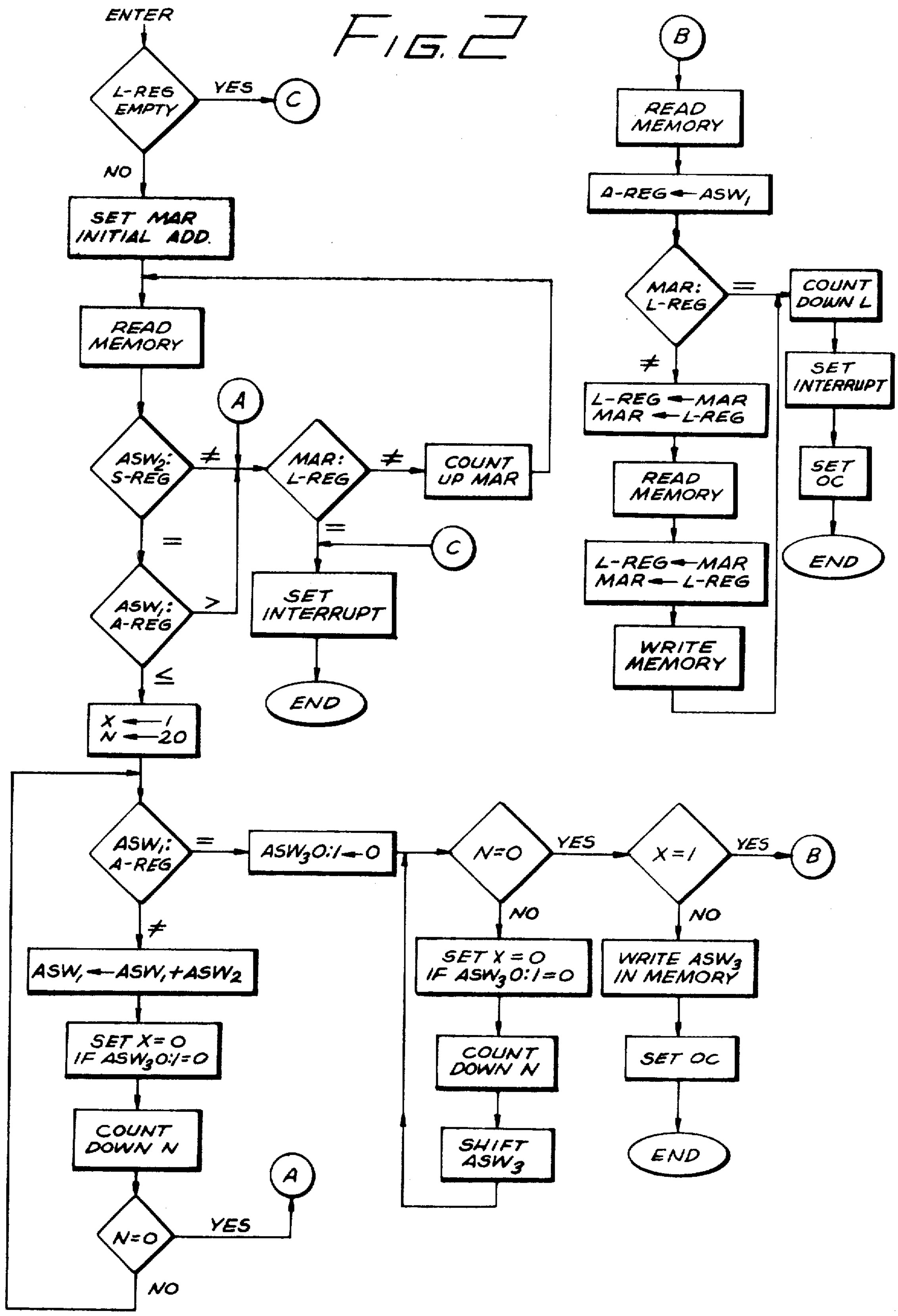
FIG. 2 is a flow diagram useful in understanding the operation of the invention.

As shown by the flow diagram of FIG. 2, the comparison between the A-register 52 and the base address $ASW_1$ is then repeated to determine if an equal or unequal condition exists. To this end, the $S_5$ state is applied to the gates 32 and 34. If the comparison is equal, indicating that the required mini area is identified by the contents of the register 20, the sequence counter automatically advances to the $S_6$ state in response to the next clock pulse.

At this stage it is necessary to reset the status bit in the $ASW_3$ portion of the area status word to indicate that the requested area, which has now been located as the lowest order area starting with the base address of the block, is again available. Thus, at this time, the lowest order status bit $ASW_3$ 0:1 is set to 1. This is accomplished by applying the $S_6$ state to set the lowest order bit position of the $ASW_3$ portion of the memory register 20 to a binary 1.

Following the flow diagram of FIG. 2, it will be seen that at this stage in the operation a determination is made of whether the N-counter is or is not at zero. If it is not zero, the sequence counter 14 automatically advances to the $S_7$ state.

At this point in the explanation and description of the invention, it should be kept in mind that if the address in the A-register, pointing to a mini area within a block which is to be returned to an Available status, points to the only remaining mini area in the block which is in use, the above-described operation results in all areas of the block being in an Available status. When all the areas in a block become available, indicated by all the status bits in $ASW_3$ being binary 1's, it is necessary to remove the entire block from the link chain of in-use spaces in memory and return the memory space to the linked chain of Available spaces. This requires that the area status word be removed from the stored list in memory and that a routine be initiated by the Master Control Program to remove the block from the link chain of in-use spaces.

To determine when all the status bits in the $ASW_3$ portion of the area status word are set to 1, indicating that all the areas in the block are available, the control flip-flop 39 is utilized. As pointed out above, the control flip-flop 39 is turned on during the $S_4$ state of the sequence counter. During the $S_7$ state of the sequence counter 14, if the $ASW_3$ 0:1 bit in the register 20 is zero, indicating that the corresponding area in the block is still in use, the flip-flop 39 is turned off. This is accomplished by an AND circuit 42 to which the X=1 state is applied, the $S_7$ state is applied, and the $ASW_3$ 0:1=0 line from the lowest order bit in the register 20 is applied. The output of the AND circuit 42 sets the flip-flop 39 back to the X=0 state. On the other hand, if the bit in the lowest order flip-flop in the register 20 is a 1, the control flip-flop 39 remains in the X=1 state.

Also during the $S_7$ state of the sequence counter 14, the N-counter 30 is counted down one by the next clock pulse passed by a gate 44 to which the $S_7$ state is applied. Also the $ASW_3$ section of the register 20 is shifted right one bit position by each clock pulse passed by a gate 45, with the lowest order bit being transferred by a gate 46 to the highest order bit position of $ASW_3$. The sequence counter remains in $S_7$ until the N-counter 30 is counted down to zero, at which time the $ASW_3$ portion of the register 20 has been shifted back to its initial condition. The sequence counter 14 is held in the $S_7$ state by the output of an AND circuit 47 which senses that the N-counter 30 is in the $\overline{ZERO}$ condition. When the N-counter 30 is counted down to zero, the sequence counter 14 advances to the $S_8$ state.

At this point, as shown by the flow diagram of FIG. 2, a determination is made of whether the flip-flop 39 is still in the X=1 state, indicating that more of the status bits in the status word are set to 0 and therefore all the areas in the block of memory are now available. If the flip-flop 39 is in the X=0 state, the sequence counter 14 advances automatically into the $S_9$ state. During the $S_9$ state, the status bits in the $ASW_3$ portion of the register 20 are written back into the status word stored in memory. To this end the $S_9$ state is applied to gate 50 which passes the next clock pulse to the WRITE input of the memory 18 to produce a WRITE cycle. Since the $ASW_1$ portion may have been modified, as hereinafter described, the $S_9$ state is applied to the $ASW_1$ portion of register 20 to inhibit the writing of this portion into memory. At the same time, a control flip-flop 74 is turned on providing an Operation Complete signal, indicated as OC, at the output of an AND circuit 54. The OC signal resets the sequence counter back to $S_0$ and starts the fetch operation to bring the next operator in the program into the OP-register 10.

The above description illustrates the operation of the Forget operator when the first area of the first area status word in the list in memory corresponds to the specified address in the A-register 52. Referring again to the flow diagram of FIG. 2, when a comparison is made between the $ASW_2$ portion of the status word in the register 20 with the contents of the S-register 22 during the $S_2$ state of the sequence counter 14, if the Compare circuit 26 indicates they are $\neq$, the next status word is read out of memory into the register 20 without any further comparison of addresses. An AND circuit 64 in response to the $S_2$ state of the sequence counter 14 and the $\neq$ state of the Compare circuit 26 sets the sequence counter to the $S_{10}$ state instead of allowing it to advance to the $S_3$ state. During the $S_{10}$ state, the L-register 56 containing the last address of the list of ASW words in memory, is compared with the address in the MAR register 16. This is accomplished by connecting the contents of the MAR register 16 through a gate 66 to one input of the Compare circuit 26. Also the contents of the L-register 56 are coupled by a gate 68 to the other input of the Compare circuit 26. If the output of the Compare circuit 26 indicates the address in the MAR register 16 is equal to the last address of the area status word list, the control flip-flop 17 is turned on, signaling an Interrupt condition. This is accomplished by an AND circuit 70 to which the $S_{10}$ state of the sequence counter 14 and the = state of the Compare circuit 26 are applied. On the other hand, if the comparison of the Compare circuit 26 is $\neq$, the sequence counter automatically advances to the $S_{11}$ state.

During the $S_{11}$ state, a gate 76 to which the $S_{11}$ state is applied, causes the MAR register 16 to be counted up one. The sequence counter 14 then advances to $S_{12}$. During the $S_{12}$ state of the sequence counter 14, a READ cycle is initiated in the memory register 18 by applying the $S_{12}$ state to the gate 21. The sequence counter 14 is then returned by the $S_{12}$ state to the $S_2$ state to repeat the comparison between the area size specified in the S-register 22 and the $ASW_2$ portion of the next area status word now in the register 20. This cycle of operation is repeated until an area status word in which $ASW_2$ corresponding to the indicated area size is located. If not located in the list an Interrupt results.

Following down the flow diagram of FIG. 2, it will be seen that when the comparison is made between the contents of the A-register 52 and the $ASW_1$ portion of the register 20 during the $S_3$ state, if the address in the A-register 52 is less than the base address specified by the status word, the next area status word in the list must be read out of memory 18, since the corresponding block in memory does not contain the addressed mini area. To this end, an AND circuit 78 senses the $S_3$ state of the sequence counter and the output of the Compare circuit 26 signaling that the contents of the A-register 52 are less than the contents of the $ASW_1$ section of the register 20. The output of the AND circuit 78 sets the sequence counter to the $S_{10}$ state, repeating the sequence described above.

Again referring to the flow diagram of FIG. 2, the next decision made in the operation is whether the contents of the A-register 52 is equal to the contents of the $ASW_1$ section of the register 20. If they are not equal, instead of advancing to the $S_6$ state, the sequence counter 14 is set to the $S_{13}$ state by the output of an AND circuit 80 to which the $S_{15}$ state of the sequence counter 14 is applied together with the $\neq$ state of the Compare circuit 26. During the $S_{13}$ state, the contents of the $ASW_1$ portion of the register is applied to one input of a binary adder 40 together with the contents of the $ASW_2$ portion. The output of the adder 40 is coupled by a gate 81 to the $ASW_1$ portion of the register 20. Thus the base address is incremented by the size of the areas in the block.

At the completion of the $S_{13}$ state, the sequence counter advances to the $S_{14}$ state during which the N-counter 30 is counted down 1, the $ASW_3$ portion of the register 20 is shifted right and, if the lowest order status bit $ASW_3$ 0:1 is a zero, as sensed by the AND circuit 42, the control flip-flop 39 is set to zero.

If the N-counter is not yet counted down to zero, the sequence counter is returned to the $S_5$ state by the output of an AND circuit 82 to which the $S_{14}$ state and the $\overline{ZERO}$ state of the N-counter 30 are applied. This causes a comparison to be again made between the contents of the A-register 52 and the now incremented address in the $ASW_1$ portion of the register 20. If the N-counter 30 is now counted down to zero, the sequence counter is returned to the $S_{10}$ state by the output of an AND circuit 83 to which the $S_{14}$ state of the sequence counter 14 is applied together with the ZERO state of the N-counter 30. This causes the next area status word to be read out of the memory 18 in the manner already described.

As shown by the flow diagram of FIG. 2, when a point is reached where the control flip-flop 39 is still in the X=1 state, and the N-counter 30 has been counted down to zero, a point is reached where the Forget operator has resulted in all of the areas within the block to be in an Available status, i.e. with all the status bits set to 1. As pointed out above, this requires that the entire block be removed from the linked chain of in-use memory spaces. To this end, instead of advancing from $S_8$ to $S_9$ to complete operation of the Forget operator, the sequence counter 14 is set to the $S_{15}$ state by the output of an AND circuit 84 which senses the $S_8$ condition of the sequence counter 14 and the X=1 state of the control flip-flop 39. During the $S_{15}$ state, a READ cycle of the memory 18 is initiated, causing the area status word to be restored in the register 20. With the sequence counter then advancing to the $S_{16}$ state, the base address in the $ASW_1$ portion of the register 20 is transferred by a gate 86 to the A-register 52. Also during the $S_{16}$ state, a comparison is made between the contents of the L-register 56, applied to one input of the Compare circuit 26 through the gate 68, and the contents of the MAR register 16 applied to the other input of the Compare circuit 26 through the gate 66. If the comparison is equal, this indicates that the area status word corresponds to the last word in the list. If the condition is equal, the sequence counter 14 advances to the $S_{17}$ state. The L-register 56 is counted down one by the next clock pulse passed by the gate 90 to which the $S_{17}$ state is applied. At the same time, the control flip-flops 17 and 74 are turned on signaling a special Interrupt condition to the processor. With the A-register 52 now storing the base address of the block, the Master Control Program, in response to the special Interrupt, can initiate a routine for transferring the entire block from the linked chain of in-use memory spaces to the linked chain of Available memory spaces. Such a routine is well known to the prior art. For example, such a routine is provided in the Burroughs B-5500 Computer System and is described in the publication "Disc File Master Control Program," a Burroughs Corporation publication dated Oct. 1966, page 35. The setting of the flip-flop 74 causes termination of the execution of the operation, resetting the sequence counter 14 to $S_0$.

If the area status word is not the last status word in the list, the comparison during the $S_{16}$ state results in an $\neq$ condition at the output of the Compare circuit 26. In this case, the sequence counter is set to the $S_{18}$ state by the output of an AND circuit 92 to which the $S_{16}$ state of the sequence counter 14 and the $\neq$ state of the Compare circuit 26 are applied. During the $S_{18}$ state, the contents of the MAR register 16 and L-register 56 are interchanged by means of gates 96 and 98, and a memory READ cycle is initiated. This places the last word in the area status word list into the register 20. The sequence counter then advances to the $S_{19}$ state during which the contents of the L-register 56 and MAR register 16 are again interchanged. This is followed by a WRITE memory cycle. This results in the last area status word in the list to be inserted in place of the area status word of the space or block being removed from the linked list by the special Interrupt. At the same time, at the end of the $S_{19}$ state, the sequence counter is returned to the $S_{17}$ state, permitting the L-register 56 to be counted down one and permitting the control flip-flops 17 and 74 to be set. This completes the operation of the Forget operator.

It will be seen from the above description that the Forget operator causes either the specified mini area in a block to be returned to an Available status by changing the corresponding status bit in the area status word or it causes a special Interrupt, signaling the Master Control Program to initiate a routine to return an entire block to the linked list of Available spaces.

What I claim is:

1. The method of deallocating a small area of memory at a specified address and of specified size where the areas are arranged in blocks and each block is defined by an area status word stored as part of a list in memory, each status word having portions identifying the base address of a block of memory space, the size of the areas within the block, and the availability status of each area within the block, the steps comprising: reading out the status words from memory in predetermined sequence, comparing said specified address with the base address of each status word having the specified size to locate a status word in which the base address is equal to or less than the specified address, repeatedly incrementing the base address of a located status word by the size of the area if the base address is less than the specified address until the incremented address equals the specified address, locating the status bit in the status word associated with the area at the specified address by the number of times said incrementing is repeated, and resetting the status bit to indicate the area is again in an Available status.

2. The method of claim 1 further including the steps of: sensing all of the status bits in the located status word, signaling when all of the status bits in the status word are indicating an Available status for the associated memory areas, and storing the base address identified in the area status word.

3. The method of claim 2 further including the steps of: removing the area status word from the list in memory when all the status bits are sensed and signaled as being in the Available status.

4. The method of claim 1 further including the steps of: sensing when the last status word has been read out of the list in memory, and signaling an Interrupt condition after the last status word has been sensed.

5. In a digital computer system, apparatus for deallocating memory space comprising: An addressable memory having a plurality of memory status words stored therein, each status word having a first group of bits defining the base address of a block of sequential address positions in the memory, a second group of bits defining a particular size of memory space for the associated block, and a third group of bits defining the availability status of each memory space within the associated block; means for reading out the status words from the memory in predetermined sequence; a first register for storing the address of the memory to be deallocated; means for comparing the first group of bits of each status with address in the first register, the comparing means signalling when the first group of bits is equal to or less than the address in the first register, means responsive to the comparing means when signalling that the first group of bits is less than the address for incrementing the first group of bits by the second group of bits of the same status word, said last-named means including means responsive to the number of status bits in the third group of bits for repeating said incrementing of the first group of bits by the second group of bits a number of times corresponding to the number of bits in said third group of bits of the status words, the incremented group of bits being applied to the comparing means; means for interrupting said incrementing means when the comparing means signals that the incremented group of bits equals the address in the first register, and means responsive to comparing means signalling an equal condition for selectively resetting the corresponding status bit in the third group of bits of the status word to indicate the addressed area in the block is again available.

6. Apparatus as defined in claim 5 further including: a second register for storing in coded form the size of the memory space to be deallocated, means for comparing the second group of bits in each status word read out of memory, said last-named comparing means signalling when the second group of bits in the status word is equal to the size in the second register, and means responsive to said last-named comparing means when it signals an equal condition for activating said means for comparing the first group of bits with the address in the first register.

7. Apparatus as defined in claim 5 further including means responsive to the resetting of the status bit for sensing if all the status bits in the associated status word have been reset to an Available status, and means responsive to said sensing means when all the status bits have been reset to an Available status for removing the associated status word from the list in memory.

8. An internally programmed computer comprising: an addressable memory, the memory having a group of memory area status words stored in a predetermined address sequence in the memory, each status word including a first group of bits specifying the base address of a block of words in memory, a second group of bits specifying the size of a memory area, and a third group of bits identifying the availability status of each area in the block, means for reading out each of said status words in sequence from the memory, first register means storing in coded form a number identifying the size of a memory area to be deallocated, means for comparing the second group of bits of each status word as it is read out of memory with the number in said first register means to locate a status word in which the second group of bits specifies the same area size as the number in the first register, a second register for storing in coded form an address of a space in memory to be changed in status, means responsive to the comparing means when a status word is located in which the second group of bits is equal to the number in the first register for applying the first group of bits of the same status word and the address in the second register to comparing means, means responsive to an output indication of the comparing means that the address in the second register is larger in value than the first group of bits for repeatedly incrementing the first group of bits by the second group of bits of the same status word, means for counting the number of times the first group of bits of the status word is incremented, means for interrupting the incrementing means when the comparing means indicates the incremented first group of bits is equal in value to the address in the second register; means synchronized with said incrementing means for sensing each of the status bits in the third group of bits in the status word in sequence with incrementing the first group of bits; means responsive to the comparing means for changing the particular status bit sensed by the sensing means when the comparing means indicates the incremented first group of bits is equal in value to the address, and means responsive to the counting means for interrupting the incrementing means and reading out the next status word in memory when the counting means reaches a predetermined count condition.

9. Apparatus as defined in claim 8 further including means responsive to said status bit changing means for indicating when the status bit is changed to the same status as all the other status bits in third group of bits of the status word, and means responsive to said indicating means for erasing the status word from the list of status words in memory.

10. Apparatus as defined in claim 9 further including means responsive to said indicating means for reading out the same status word from memory and transferring the base address identified by the first group of bits of the status word to the second register.